Figure 1:
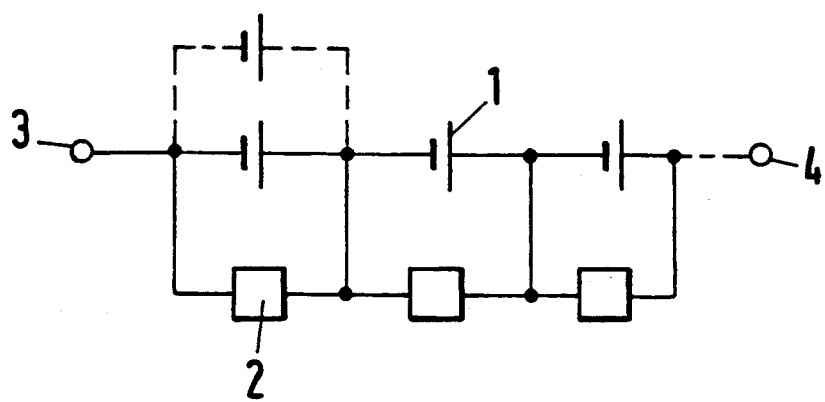

United States Patent
Birnbreier et al.

[11] Patent Number: 5,099,188
[45] Date of Patent: Mar. 24, 1992

[54] PROTECTION DEVICE FOR HIGH-TEMPERATURE BATTERIES

[75] Inventors: Hermann Birnbreier, Sandhausen; Stefan Mennicke, Gauangelloch, both of Fed. Rep. of Germany

[73] Assignee: Asea Brown Boveri Aktiengesellschaft, Manheim, Fed. Rep. of Germany

[21] Appl. No.: 615,495

[22] Filed: Nov. 19, 1990

[30] Foreign Application Priority Data

Nov. 17, 1989 [DE] Fed. Rep. of Germany ....... 3938262

[51] Int. Cl.$^5$ .................................... H01M 10/42
[52] U.S. Cl. ........................................ 320/13
[58] Field of Search ............... 429/7; 320/13, 14, 17, 320/18, 35, 36

[56] References Cited

U.S. PATENT DOCUMENTS

| | | | |
|---|---|---|---|
| 2,309,054 | 1/1943 | Fell | 320/36 |
| 3,102,222 | 6/1961 | Harmer | 320/36 |
| 3,213,345 | 10/1965 | Loftus | 320/17 |
| 3,237,078 | 2/1966 | Mallory | 320/17 |
| 3,328,663 | 6/1967 | Kagan | 320/17 |
| 4,079,303 | 3/1978 | Cox | 320/17 |
| 4,303,877 | 12/1981 | Meinhold | 320/36 |
| 4,331,745 | 5/1982 | Catanzarite | 429/105 |
| 4,352,867 | 10/1982 | Catanzarite | 429/101 |
| 4,385,101 | 5/1983 | Catanzarite | 429/94 |
| 4,414,297 | 11/1983 | Fischer | 429/104 |
| 4,651,253 | 3/1987 | Petri et al. | 361/124 |
| 4,713,597 | 12/1987 | Altmejd | 320/13 |
| 4,719,401 | 1/1988 | Altmejd | 320/13 |
| 4,849,806 | 7/1989 | Kahlen et al. | 357/51 |

FOREIGN PATENT DOCUMENTS

| | | | |
|---|---|---|---|
| 0119147 | 11/1944 | Australia | 320/18 |
| 2376454 | 9/1978 | France | 320/35 |
| 0479573 | 9/1951 | Italy | 429/7 |

Primary Examiner—Steven L. Stephan
Assistant Examiner—Thomas M. Dougherty
Attorney, Agent, or Firm—Herbert L. Lerner; Laurence A. Greenberg

[57] ABSTRACT

In high-temperature batteries which contain a series circuit of galvanic cells with a solid electrolyte, the solid electrolyte can be damaged without the damage being noticed when the battery is short circuited in the cold condition and a voltage reversal occurs at individual cells. According to the invention, a protection device is formed of elements that are connected in parallel with the cells. The elements have a high resistance at the operating temperature of the battery and a low resistance in the cold condition. The elements form a voltage divider in the case of a short circuit caused at external terminals of a cold battery. The voltage divider ensures the desired voltage division.

12 Claims, 1 Drawing Sheet

PROTECTION DEVICE FOR HIGH-TEMPERATURE BATTERIES

The invention relates to a protection device for preventing a voltage reversal at galvanic cells of a high-temperature battery.

High-temperature batteries, which are also referred to as high-energy batteries, operate at a temperature which is distinctly above the ambient temperature. A typical representative of such high-temperature batteries is a sodiumsulphur battery which operates at approximately 300° C. Such a battery contains several series-connected single cells or series-connected groups of parallel-connected cells in order to achieve a required battery voltage.

The set of problems which the invention is to overcome will be explained with reference to the sodium-sulphur battery in the text which follows.

The galvanic cells of the sodium-sulphur battery contain a solid ceramic electrolyte and reactants which are liquid at operating temperature. The internal electric resistance of the cells is highly dependent on temperature. That fact is attributable to the temperature-dependence of the solid electrolyte and to the fact that the viscosity of liquid reactants increases with decreasing temperature, as a result of which the transfer of mass is impeded. The internal resistance increases greatly when the temperature drops below the point of solidification of the reactants.

If such cells are cooled to ambient temperature, the internal resistance of one cell is several ohms to several kiloohms and may even be several Mohms. Previous experience has shown that, for example in the case of sodium-sulphur cells of the same size and model, no reproducible internal resistances of the same magnitude are produced. Thus, in a series circuit of several cells, different internal resistances are effective per cell with the same magnitude of no-load voltage. If such a series circuit is short circuited at the two outer terminals of the battery, different voltages are dropped across the individual cells depending on the amount of the internal resistances thereof. If there is a great spread between the internal resistances, a voltage reversal can occur at one or more cells.

Solid electrolytes which are formed, for example, of beta aluminum oxide, can become damaged in the event of voltage reversal. Such damage can lead to a fracture of the solid electrolyte during or after a reheating of the cells to the operating temperature.

A short circuit of a cold battery can be produced accidentally or by lack of precautions without it being noticed. In contrast to batteries which operate at ambient temperatures and draw attention to a short circuit by an arc or by the battery heating up or being destroyed, cold high-temperature batteries do not show any effect which is visible on the outside in the event of a short circuit.

In practice, a defect produced by a previous short circuit at individual cells cannot be detected even by checking the high-temperature battery before the reheating.

It is accordingly an object of the invention to provide a protection device for high-temperature batteries, which overcomes the hereinafore-mentioned disadvantages of the heretofore-known devices of this general type and which prevents cells from being damaged as a consequence of a voltage reversal due to a short circuit at a cold battery.

With the foregoing and other objects in view there is provided, in accordance with the invention, a protection device for preventing a voltage reversal at galvanic cells of a hightemperature battery having a series circuit of individual cells or groups of cells and external battery terminals, comprising means connected in parallel with the cells for providing a high electrical resistance at an operating temperature of the battery and for providing an electrical resistance being low in comparison with an internal electrical resistance of the cells below a predetermined lower limit temperature of the battery, so that the means form a voltage divider determining a voltage division across the cells when a circuit is closed through the external battery terminals. The means may be separate means each being connected in parallel with a respective one of the cells.

In accordance with another feature of the invention, means all have an at least approximately equal low resistance below the predetermined lower limit temperature.

In accordance with a further feature of the invention, the means short circuit the cells.

In accordance with an added feature of the invention, the means are switches operating under temperature control or PCT resistors. Temperature-controlled switches or temperaturedependent resistors are particularly suitable as the means connected in parallel with the cells.

In accordance with an additional feature of the invention, the means are elements formed of a material, such as aluminum chloride, being electrically insulating at relatively high temperatures and electrically conducting at relatively low temperatures.

In accordance with a concomitant feature of the invention, the means are switches which switch due to a determination of a voltage reversal and even at a very low threshold voltage.

An advantage of the proposed protection device is that it becomes automatically effective when the temperature drops below a predetermined lower battery temperature, that is to say it acquires a sufficiently low resistance to force a desired voltage division if a circuit is closed through the external terminals of the battery. In addition, the device automatically acquires sufficient high resistance in the region of the operating temperature of the high-temperature battery so that any self-discharging of the battery is avoided.

Other features which are considered as characteristic for the invention are set forth in the appended claims.

Although the invention is illustrated and described herein as embodied in a protection device for high-temperature batteries, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
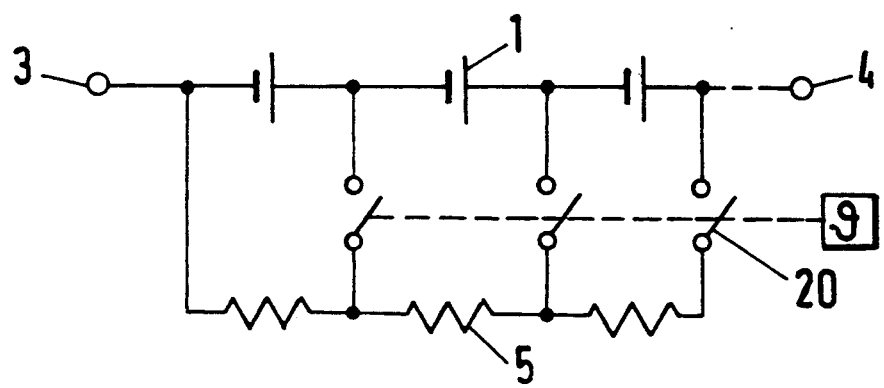
Figure 3:
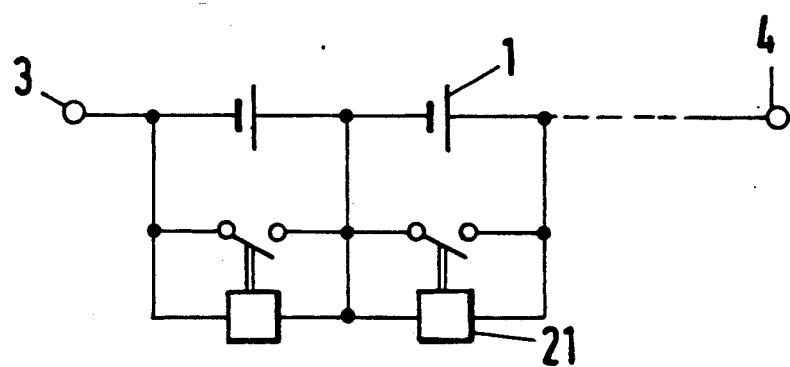

FIGS. 1 to 3 are schematic and block circuit diagrams of illustrative embodiments of protection devices according to the invention.

Referring now to the figures of the drawing in detail and first, particularly, to FIG. 1 thereof, there is seen a series circuit of galvanic cells 1. Broken lines indicate that parallel-connected groups of cells 1 can also be present instead of individual cells. In other words, the cells are individual cells or groups of parallel-connected cell elements. In the possible embodiments shown in the remaining figures as well, it is also true that groups of parallel-connected cells can be present instead of individual cells. Means 2 which are connected in parallel with each cell 1 (or cell group) have a high resistance in the operating-temperature range of the battery and acquire a very low resistance, which in any case is a distinctly lower resistance than that of the existing cells, after the temperature drops below a predetermined lower temperature value. If a circuit is closed, for example by a short circuit, through external terminals 3, 4 of the battery, namely the battery terminals, the means 2 act as voltage divider and determine the voltage division across the cells 1. When all of the means 2 exhibit the same resistance, a uniform voltage division is achieved. PCT resistors or elements of aluminum chloride, for example, are suitable as the means 2.

FIG. 2 shows another embodiment in which temperaturecontrolled switches 20 each connect a respective low-resistance resistor 5 in parallel with the cells 1. Reference symbol d represents an actuator for the switches 20 which operates according to temperature. The resistance value of the resistors 5 can also be selected to be zero, so that the cells 1 are short circuited if the respective cell type permits such a short circuit in the cold condition.

FIG. 3 shows a further embodiment in which switches 21 are are provided in order to detect a voltage reversal over a cell 1 and to close a contact which bypasses the cell 1.

Switching elements which are suitable for this structure are electrochemical elements with a reversible and a blocking electrode and a solid electrolyte. Such elements have been described by Wheat as timers or Coulomb meters in- J. Can. Ceram. Soc. (1978), 47, 13. Since the cells are sensitive even to very small negative voltages, no switch may be used which only becomes conductive on the other side of a threshold voltage. The element described by Wheat may meet the requirements if the supply of mobile material is selected to be large enough to ensure that it is not completely transferred to the blocking electrode during the short circuit.

We claim:

1. Protection device for preventing a voltage reversal at galvanic cells of a high-temperature battery having a series circuit of cells and external battery terminals, comprising means connected in parallel with the cells for providing a high electrical resistance at an operating temperature of the battery and for providing an electrical resistance being low in comparison with an internal electrical resistance of the cells below a predetermined lower limit temperature of the battery, the lower limit temperature being lower than the operating temperature of the battery, said means forming a voltage divider determining a voltage division across the cells when a circuit is closed through the external battery terminals.

2. Protection device according to claim 1, wherein said means include separate means each being connected in parallel with a respective one of the cells.

3. Protection device according to claim 2, wherein the cells are individual cells.

4. Protection device according to claim 2, wherein the cells are groups of parallel-connected cell elements.

5. Protection device according to claim 2, wherein said means all have an at least approximately equal low resistance below said predetermined lower limit temperature.

6. Protection device according to claim 2, wherein said means short circuit the cells.

7. Protection device according to claim 2, wherein said means are switches operating under temperature control.

8. Protection device according to claim 2, wherein said means are PCT resistors.

9. Protection device according to claim 2, wherein said means are elements formed of a material being electrically insulating at the operating temperature of the battery and electrically conducting at relatively lower temperature.

10. Protection device according to claim 2, wherein said means are elements formed of aluminum chloride being electrically insulating at the operating temperature of the battery and electrically conducting at relatively lower temperatures.

11. Protection device according to claim 2, wherein said means are switches which switch due to a determination of a voltage reversal.

12. Protection device according to claim 11, wherein said switches continue to switch at a predetermined low threshold voltage.

* * * * *